United States Patent Office 3,358,007
Patented Dec. 12, 1967

---

3,358,007
WATER SOLUBLE STANNOUS FLUORIDE CHELATES OF HYDROXYETHYL- AND CARBOXYLMETHYL SUBSTITUTED AMINES
Horst G. Langer, Cochituate, Mass., assignor to The Dow Chemical Company, Midland, Mich., a corporation of Delaware
No Drawing. Filed Feb. 18, 1964, Ser. No. 345,568
6 Claims. (Cl. 260—429.7)

This invention is concerned with a line of new chemical compounds characterized as the tin chelates of stannous tin and amino acetate alkylol groups, wherein a nitrogen atom carries carboxymethyl group and a hydroxyethyl group and the tin compound also carries a fluorine atom, so that a soluble complex of the following general formula is obtained:

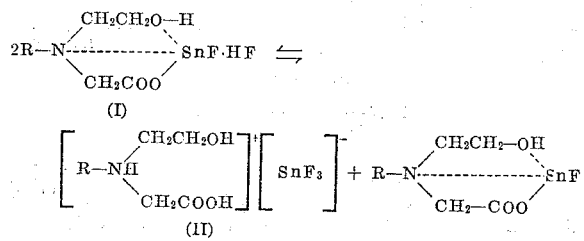

the (I) representing its formula in solid form and (II) its formula in aqueous solution.

Thus, the invention is concerned with this new family of compounds and a method for their formation and it includes any chelate of tin which carries the hydroxyethyl and carboxymethyl groups on the same nitrogen atom, so long as a second carboxymethyl group is not available in a favorable position to tie up the tin in a 6–7 member ring structure, such unfavorable compound being the following:

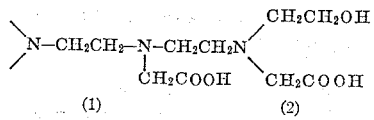

wherein the indicated (1) and (2) —$CH_2COOH$ groups could interfere with the formation of the desired type of compound. However, if the (1) —$CH_2COOH$ group were absent, terminal —$CH_2COOH$ groups would not interfere with the complex formation.

Accordingly, the compounds are tin fluoride chelates, soluble in water, characterized by the presence in the compound of a hydroxyethyl group (hydroxyalkyl) and a carboxymethyl (carboxyalkyl) group related to a nitrogen atom so that a chelate ring can be formed between them, employing the hydroxy alkyl. Hence, in general terms, any compound in which the following moiety occurs:

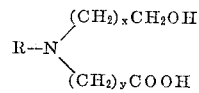

$x$ and $y$ being integers of value 1, 2, 3, R being a polyamino polycarboxylic acid chelating agent moiety as defined below such that at least six members including the nitrogen are available for ring formation with the stannous fluoride and not more than ten members are available.

In accordance with this invention, therefore, the compounds may be defined as follows: by replacing one of the carboxymethyl groups of a polyamino polycarboxylic acid chelating agent with a hydroxymethylene group, and employing a stannous fluoride in reaction with the chelating agent, a soluble complex of the following general structure is obtained:

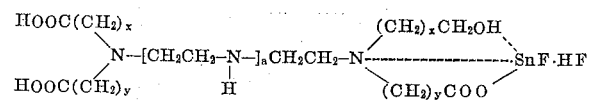

$x$ and $y$ being integers such that 6–7–8–10 member rings are formed in chelation reactions; $a$ being 0, 1, 2, 3, or 4; wherein the chelate ring will form with a useful degree of stability.

Typical chelate compounds which are formed in accordance with this invention are from stannous fluoride reacted with the hydroxyethylethylenediamine triacetic acid compounds. An alkylene spacing group of 2 carbon atoms between the nitrogens will make available on the terminal nitrogen as follows:

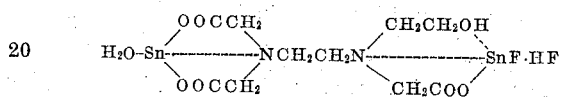

a hydroxy ethyl group and an acetic acid moiety useful for the chelation reaction. Thus, upon reaction with stannous fluoride, the following compound is formed:

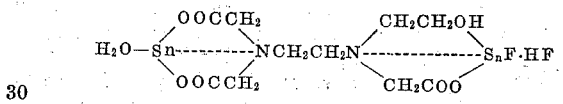

the tin thereby being reacted with the carboxymethyl group and coordinately satisfied by the hydroxyethyl group. The organic part of the compound is insufficiently supplied with nearby carboxymethyl groups to interfere.

Similarly, propionic compounds will participate in the reaction.

Other compounds useful for the purpose are those which involve multiples of any of those compounds in which acetic acid groups are available and are adequately spaced to form the type of chelate shown. Other compounds are, therefore, as follows: hydroxyethyl diethylene triamine triacetic acid.

EXAMPLE I

In the preparation of this compound, 2.78 grams (0.01 mole) of HEDTA (hydroxyethyl ethylene diamine triacetic acid) is dissolved in 20 milliliters of hot oxygen-free water. Under a blanket of nitrogen, 3.13 grams (0.02 mole) of solid stannous fluoride is added to this solution. From the resulting clear solution, the chelate is precipitated with ethanol or acetone.

Following this procedure, any chelate which contains the hydroxyethyl and carboxymethyl groups on the same nitrogen atom will be satisfactory, as long as a second carboxymethyl group is not available in a sterically favorable position to react with the tin in a fully coordinated metal chelate structure. Only $SnF_2$ will give the water soluble chelate; $SnCl_2$ gives a water insoluble chelate.

Conditions can be varied with no change in results as long as a clear solution is obtained after mixing both reagents. The reaction must be carried out under an inert atmosphere to avoid oxidation to tin (IV). Temperature is not critical.

EXAMPLE II

Using the same procedure, the complex of stannous fluoride and hydroxyethyl ethylene diamine acetic acid is formed with the following formula:

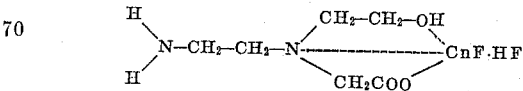

EXAMPLE III

Using the same procedure, the complex of stannous fluoride and hydroxyethyl nitrilo monoacetic acid is formed with the following formula:

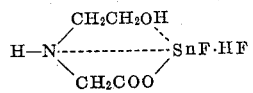

EXAMPLE IV

Using the same procedure of Example II, the complex of stannous fluoride and N-2-hydroxyethyl,N,N",N"-diethylene triamine triacetic acid is formed with the following formula:

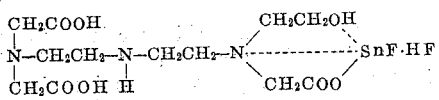

The usefulness of the compounds is in virtually any system in which tin or tin fluoride can be used. Plating baths take the compounds quite well.

Since the compound is water soluble, it becomes available for incorporation into mouth wash and for topical application to teeth. Likewise, the presence of amino acid in the mouth wash is helpful. In a toothpaste, it is useful because it provides tin fluoride in a non-hydrolyzing form, yet enough to react with dental enamel to form surface tin phosphates.

For use in toothpaste formulations, it is generally desirable to neutralize the free acetic acid groups at least partially so as to give the compound a pH acceptable to the typical mouth, that is, a pH in the range of from about 5–8. Sodium is the obvious salt forming ion for the partial neutralization and neutralization of the compounds. However, calcium has the advantage that when it is used, there is no tendency of the compound to extract calcium from the tooth. Thus, for example, ethylene diamine tetraacetic acid or hydroxyethyl ethylene diamine triacetic acid or nitrilo triacetic acid, each having a pair of acetic acid groups on spaced nitrogens or a single nitrogen, available for chelation, at approximately neutral pH's will grasp calcium so firmly that they can extract it from the tooth structure itself. Hence, the desirability of partial neutralization with calcium.

What is claimed is:

1. A stannous fluoride chelate complex compound corresponding to the following formula:

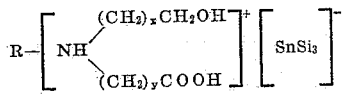

wherein $x$ and $y$ are integers independently having values in the range 1, 2, 3, 4, such that the terminal moiety is sterically favorable to the formation of stannous fluoride complexes in having six to ten atoms available for chelate formation, R being selected from the group consisting of H and polyamino polycarboxylic acid moieties.

2. A stannous fluoride complex compound comprising a stannous fluoride complex of hydroxy ethyl ethylene diamine triacetic acid, corresponding to the following formula:

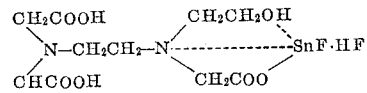

3. A stannous fluoride complex compound comprising a stannous fluoride complex of hydroxy ethyl ethylene diamine acetic acid, corresponding to the following formula:

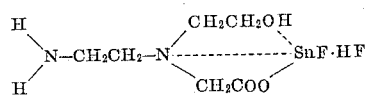

4. A stannous fluoride complex compound comprising a stannous fluoride complex of hydroxy ethyl nitrilo monoacetic acid, corresponding to the following formula:

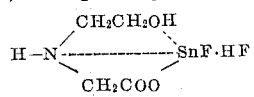

5. A stannous fluoride complex compound comprising a stannous fluoride complex of diethylene triamine N,N-diacetic N",N"-hydroxyethyl acetic acid, corresponding to the following formula:

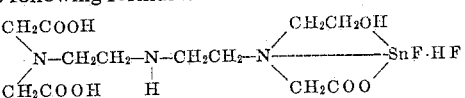

6. A stannous fluoride complex compound formed by reaction of stannous fluoride and a chelating agent selected from the group consisting of monohydroxy ethyl nitrilo acetic acid, monohydroxy ethyl ethylene diamine triacetic acid, N-2-hydroxyethyl,N,N",N"-diethylene triamine triacetic acid, and the corresponding compounds wherein hydroxy ethyl is replaced by hydroxy propyl and acetic acid by propionic acid.

References Cited

UNITED STATES PATENTS

| | | | |
|---|---|---|---|
| 3,091,522 | 5/1963 | Hemwell | 260—429 X |
| 3,132,934 | 5/1964 | Sallmann | 260—429 X |
| 3,152,155 | 10/1964 | Langer | 260—429 |

TOBIAS E. LEVOW, *Primary Examiner.*

W. F. W. BELLAMY, *Assistant Examiner.*

UNITED STATES PATENT OFFICE
CERTIFICATE OF CORRECTION

Patent No. 3,358,007                                              December 12, 1967

Horst G. Langer

It is hereby certified that error appears in the above numbered patent requiring correction and that the said Letters Patent should read as corrected below.

Column 2, lines 68 to 72, the formula should appear as shown below instead of as in the patent:

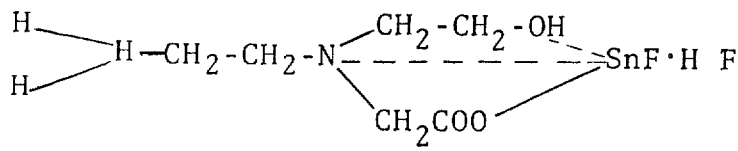

column 3, lines 49 to 55, the formula should appear as shown below instead of as in the patent:

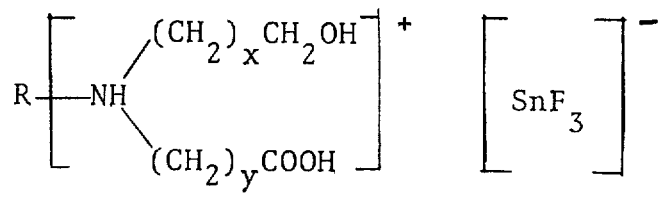

column 4, lines 9 and 12, the formula should appear as shown below instead of as in the patent:

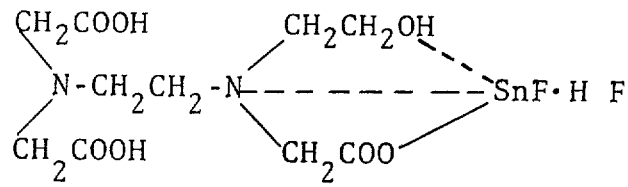

Signed and sealed this 15th day of April 1969.

(SEAL)
Attest:

EDWARD M. FLETCHER, JR.                          EDWARD J. BRENNER
Attesting Officer                                  Commissioner of Patents